US006968076B1

(12) United States Patent
OuYang et al.

(10) Patent No.: US 6,968,076 B1
(45) Date of Patent: Nov. 22, 2005

(54) METHOD AND SYSTEM FOR PRINT QUALITY ANALYSIS

(75) Inventors: William M. OuYang, Rochester, NY (US); Jack Whipple, North Rose, NY (US)

(73) Assignee: Xerox Corporation, Stamford, CT (US)

( * ) Notice: Subject to any disclaimer, the term of this patent is extended or adjusted under 35 U.S.C. 154(b) by 797 days.

(21) Appl. No.: 09/707,085

(22) Filed: Nov. 6, 2000

(51) Int. Cl.[7] ................................................ G06K 9/00
(52) U.S. Cl. .......................... 382/112; 399/15; 358/406
(58) Field of Search ........................ 382/112, 286, 287, 382/141, 312, 217; 358/406; 348/88, 125, 348/406, 496; 399/15, 31

(56) References Cited

U.S. PATENT DOCUMENTS

| | | | | |
|---|---|---|---|---|
| 5,057,936 A * | 10/1991 | Bares | ......................... | 358/405 |
| 5,278,624 A * | 1/1994 | Kamprath et al. | .......... | 355/317 |
| 5,546,165 A * | 8/1996 | Rushing et al. | ............. | 355/208 |
| 5,625,703 A * | 4/1997 | Okuda et al. | ............... | 382/112 |
| 6,275,600 B1 * | 8/2001 | Banker et al. | .............. | 382/112 |
| 6,335,978 B1 * | 1/2002 | Moscato et al. | ............ | 382/112 |

* cited by examiner

*Primary Examiner*—Jose L. Couso
*Assistant Examiner*—Tom Y. Lu
(74) *Attorney, Agent, or Firm*—Fay, Sharpe, Fagan, Minnich & McKee, LLP

(57) ABSTRACT

A system is disclosed for detecting defects in a printed image to analyze print quality of printers or copiers. The printed image is scanned by the scanner and the printed image data obtained in the scanner is fed back and compared with original image data. The system detects defects in the printed image in a closed loop manner. The printed image data is automatically fed back to a control unit so that a processor compares the printed image data with the original image data to detect defects in the printed image. The system analyzes comparison results to find skew in the printed image.

11 Claims, 8 Drawing Sheets

METHOD AND SYSTEM FOR PRINT QUALITY ANALYSIS

TECHNICAL FIELD

The present invention relates generally to a printing system and more particularly to methods and systems for detecting defects in a printed image to analyze print quality of the printed image in the printing system.

BACKGROUND OF THE INVENTION

Electrophotography (or Xerography) is the most common photocopying method. Electrophotography techniques are widely employed in commerce and industry in such devices as electrostatic dry photocopiers, computer laser printers and plain-paper facsimile machines.

In an electrophotographic printing system, an image is reproduced by transferring the image by means of attractive forces of electric charges. The electric charges are initially spread over a photoreceptor (charging). The electric charges that correspond to the image remains on the photoreceptor and the other charges on the photoreceptor are removed by a lay such as a laser beam (exposing). A plastic powder called toner is introduced to the remaining electric charges (developing). A sheet of paper is then passed between the photoreceptor and another charged object that draws the toner from the photoreceptor to the substrate (transferring). The toner is fused to the substrate with heat (fusing).

The image printed on a substrate may be affected by the operation of each process unit for charging, exposing, developing, transferring or fusing. The printed image is analyzed to adjust such process units. The printed image is usually analyzed by a manufacturer in a manufacturing stage to set up the parameters of the process units. The printed image may also be analyzed by technical representatives in the field to adjust the parameters of the process units.

The conventional analysis is manually performed. In the conventional method, the quality analysis is performed by the manufacturer at a manufacturing stage or by technical representative in the field. The conventional manual analysis tends to cause errors in the analysis and cannot ensure accurate data for parameters of process units.

The conventional analysis is manually performed. In the conventional method, the quality analysis is performed by the manufacturer at a manufacturing stage or by technical representative in the field. The conventional manual analysis trends to cause errors in the analysis and cannot ensure accurate data for parameters of process units.

SUMMARY OF THE INVENTION

The present invention provides methods and systems for detecting defects of a printed image to analyze print quality of the printed image in a printing system. The present invention provides a scanner to read the printed image. The printed image data obtained in the scanner is compared with original image data to detect defects of the printed image.

An objective of the present invention is to analyze print quality of a printed image in a closed loop manner. A scanner for reading the printed image acts as part of a closed feedback loop with a processor that originally generated data for printing an original image. The printed image scanned by the scanner is fed to the processor to be compared with the original image.

Another objective of the present invention is to automatically analyze print quality of a printed image in a printing system. The printed image data scanned by a scanner is automatically fed back to a processor and compared with original image data. The processor automatically analyzes print quality of the printed image based on the comparison.

In accordance with one aspect of the present invention, a system for detecting defects of a printed image to analyze print quality of the printed image is provided. The system includes a processor for generating data for printing an original image. The original image is printed on a substrate in a printing engine based on the generated data. The printed image is scanned by a scanner to obtain printed image data. The processor compares the printed image data with the original image data to detect defects of the printed image and to determine the print quality of the printed image.

In accordance with another aspect of the present invention, a method for detecting defects of a printed image to analyze print quality of the printed image is provided. Data for printing an original image is generated. One or more reference marks are added to the original image data to indicate relative pixel locations of the original image data. The original image is printed on a substrate with the reference mark. The printed image is scanned to obtain printed image data. The printed image data is compared with original image data on a pixel by pixel basis. Pixel locations of the printed image data are determined relative to the reference marks.

Another method for detecting defects of a printed image to analyze print quality of the printed image is to provide a half-tone test patch. The half-tone test patch is generated and printed on a substrate. The half-tone test patch may have one or more half-tone values. The printed image of the half-tone test patch is scanned to obtain half-tone values of the test patch printed on the substrate. The half-tone values of the printed half-tone test patch are compared with the half-tone values of the original half-tone test patch.

Still another method for detecting defects of a printed image is to provide a unit for checking and adjusting registration and skew of a substrate on which an original image is printed in a printing engine is provided. Registration and skew of the substrate are examined to ensure that the original image is printed in an exacting fashion on the substrate. The printed image is scanned to obtain printed image data. The printed image data is compared with the original image data on a pixel by pixel basis. The pixel locations of the printed image data are assumed to be the same as pixel locations of the original image data.

In accordance with further aspect of the present invention, a method for detecting skew of a printed image is provided. Data is generated for printing an original image in the printing system. The image is printed on a substrate, and the printed image is scanned by a scanner to obtain printed image data. The printed image data is compared with the original image data. One of the methods mentioned above (i.e., methods using a reference mark, a half-tone test patch and a unit for detecting and adjusting registration and skew of a substrate) may be utilized to compare the printed image data with the original image data. Skew of the printed image is determined based on the analysis of the printed image. A plurality of defective pixels in a line with a large difference between the printed image data and the original image data may imply skew of the printed image.

The present invention provides methods and systems for automatically analyzing print quality of the printed image in a closed loop manner. The present invention has an effect to save time taken in analyzing print quality of the printed image by building a closed loop. In addition, the automatic analysis by a computer ensures accuracy of the data for process units of a printing system.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention provides a mechanism for analyzing and improving print quality of a printed image in an image reproducing apparatus, such as a printer or copier. The illustrative embodiment detects defects in the image reproduced by the image reproducing apparatus by comparing the printed image with an original image. In particular, the printed image is fed to a processor in a closed loop manner to be compared with the original image. For the purpose of building a closed feedback loop, a scanner is located to read the printed image. The scanner is also connected to the processor so that the printed image scanned by the scanner is fed to the processor.

The processor compares a printed image with an original image on a pixel by pixel basis. The processor determines pixel locations of the printed image and the original image to compare pixels at same locations within the respective images. The illustrative embodiment employs several methods for determining the pixel locations in the printed image and the original image.

The first method adds at least one reference mark to the original image to indicate relative pixel locations of the image. The original image with the reference mark is printed. The printed image is scanned by a scanner and analyzed to find the reference mark. Pixel locations of the printed image are determined relative to the reference mark. The processor compares pixels of the printed image with pixels of the original image at corresponding locations.

The second method generates and prints a test patch of a half-tone image. The printed half-tone image is scanned and fed to a processor. The processor compares the half-tone value of the printed test patch with the half-tone value of the original test patch.

The third method provides a device for checking and adjusting registration and skew of a printed image. If there is exact registration and no skew in the printed image, the scanned printed image is assumed to have the same pixel locations as the original image.

The illustrative embodiment of the present invention may also be used for detecting skew of a printed image by analyzing the printed image. The printed image is fed to a processor and compared with an original image. The processor compares pixels of the printed image and the original image by using one of the methods mentioned above. The presence of more than a predetermined number of pixels in a line of pixels with large differences between the pixel value of the printed image and pixels value of the original image implies skew in the printed image.

The illustrative embodiment of the present invention automatically analyzes print quality of a printed image in a closed loop manner. A scanner provides data to a processor, which compares a printed image with an original image.

Figure 1:
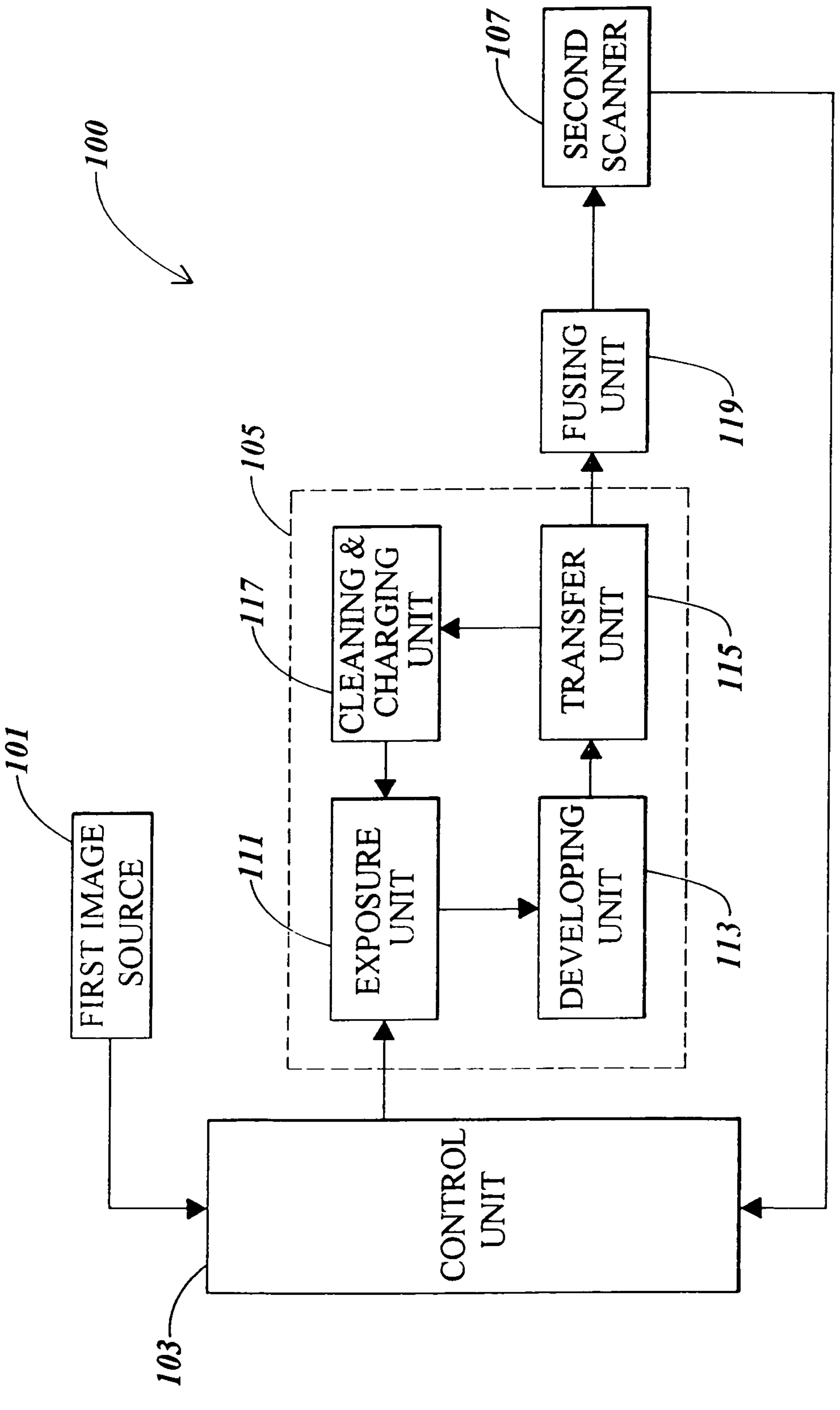
FIG. 1 is an example of a block diagram of an image reproducing apparatus in which the illustrative embodiment of the present invention may be practiced.

FIG. 1 is an example of a block diagram of an image reproducing apparatus 100. The apparatus 100 includes a first image source 101, a control unit 103, a printing engine 105, a fusing unit 119 and a second scanner 107. The first image source 101, may be, for example, an image scanner, a computer system or a storage device, such as a tape medium. The control unit 103 receives data for an original image from the first image source 101. The control unit 103 generates data for printing the original image in the printing engine 105. The printing engine 105 forms a printed image for the original image on a substrate (such as a paper sheet) based on the data generated in the control unit 103.

The printing engine 105 includes an exposure unit 111, a development unit 113, a transfer unit 115, and a cleaning & charging unit 117. The exposure unit 111 forms an image with electric charges on a photoreceptor over which electric charges are initially spread in the charging unit 117. The exposure unit 111 removes the electric charges other than the charges corresponding to the original image. In the development unit 113, a plastic powder called toner is introduced to the photoreceptor. The toner that is charged with opposite polarity to the electric charges on the photoreceptor sticks to the charges on the image area of the photoreceptor. A substrate is then passed through the transfer unit 115. In the transfer unit 115, the toner on the image area of the photoreceptor is transferred to the substrate by a charged object that draws the toner from the photoreceptor to the substrate. After the toner is transferred from the photoreceptor to the substrate, the cleaning unit 117 removes remaining toner on the photoreceptor for next cycle. The cleaned photoreceptor is evenly charged again in the charging unit 117.

The toner image formed in a substrate is fixed on the substrate in the fusing unit 119 by applying high temperature and pressure to the substrate. Those of skill in the art will appreciate that the printing engine 105 may include the fusing unit 119 even though the fusing unit 119 is depicted outside the printing engine 105 in FIG. 1. The substrate with the printed image fixed in the fusing unit 119 is sent to the second scanner 107.

The printed image on the substrate is scanned by the second scanner 107 to obtain data regarding the printed image. The second scanner 107 sends the printed image data to the control unit 103. The control unit 103 compares the printed image data with the original image data on a pixel by pixel basis. The control unit 103 detects defects of the printed image on the basis of this comparison. The control unit 103 determines the print quality of the printed image by analyzing the defective pixels of the printed image, such as the number of defective pixels.

Figure 2:
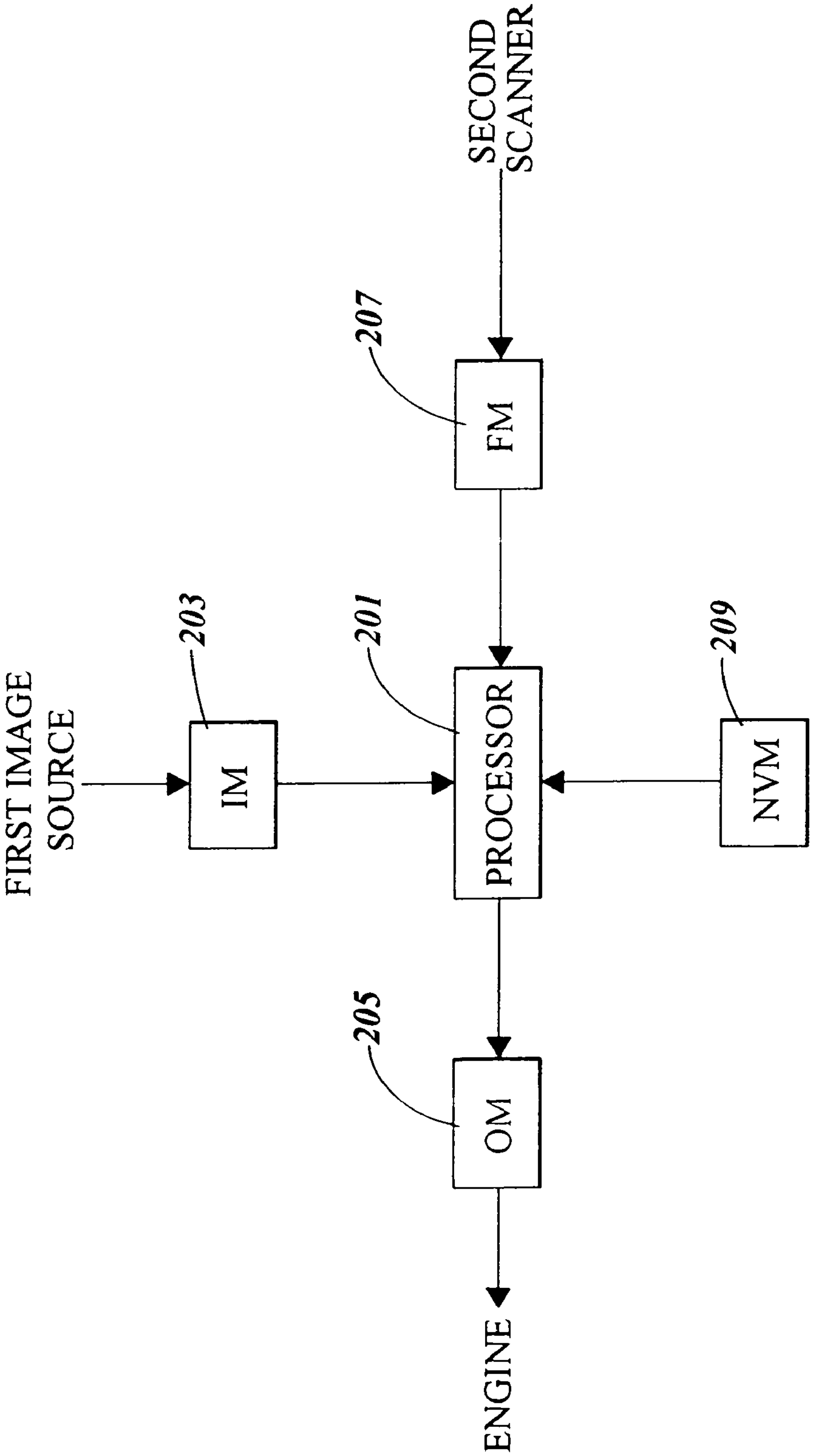
FIG. 2 shows the control unit of FIG. 1 in more detail.

FIG. 2 is an example of a block diagram of a control unit 103 shown in FIG. 1 to illustrate in more detail the structure of the control unit 103. The control unit 103 includes a processor 201, an input memory (IM) element 203, an output memory (OM) element 205, a feedback memory (FM) element 207 and a non-volatile memory (NVM) element 209. Data for the original image is input from a first image source 101 and stored in the input memory element 203. The processor 201 generates data for printing the original image in the printing engine 105 based on the original image data. The generated data is stored in the output memory element 205 and sent to the printing engine 105.

The non-volatile memory element 209 stores a plurality of data for process units in the printing engine 105. In particular, the non-volatile memory element 209 stores a threshold value of the difference between the original image data and the printed image data for determining whether a pixel of printed image is defective. The non-volatile memory element 209 may also store a threshold value that identifies a critical number of defective pixels that is used to determine whether the printed image is acceptable or not. Those values stored in the non-volatile memory element 209 may be input by a manufacturer in the manufacturing stage or technical representatives in the field.

Printed image data is input from a second scanner 107 and stored in the feedback memory element 207. The processor 201 compares the original image and the printed image on a pixel by pixel basis. Methods for determining pixel locations of the printed image are described below in more detail. If the resolution of the original image data is equal to that of the printed image data, the data in the feedback memory element 207 may directly be compared with the data in the input memory element 203. If the resolutions are different, either the data in the feedback memory element 207 or the data in the input memory element 203 may be interpolated to generate data with same resolution as the other data.

In addition, if the original image is reproduced by a same size, the data in the feedback memory element 207 may directly be compared with the data in the input memory element 203. If the original image is enlarged to a larger size or reduced to a smaller size, the data in the feedback memory element 207 may be processed so that the printed image has a same size as the original image. Those of skill in the art will appreciate that the techniques for enlarging or reducing the original image data may be adopted to reduce or enlarge the printed image data.

The processor 201 calculates a difference in pixel values, such as chrominance, luminance or intensity, between the original image and the printed image for each pixel. The processor 201 compares the difference with a threshold value stored in the non-volatile memory element 209. The processor 201 may count the number of defective pixels whose difference is greater than the threshold value. The processor 201 may compare the number of defective pixels with a critical value stored in the non-volatile memory element 209. The processor 201 may determine whether the printed image is acceptable based on the comparison.

Figure 3:
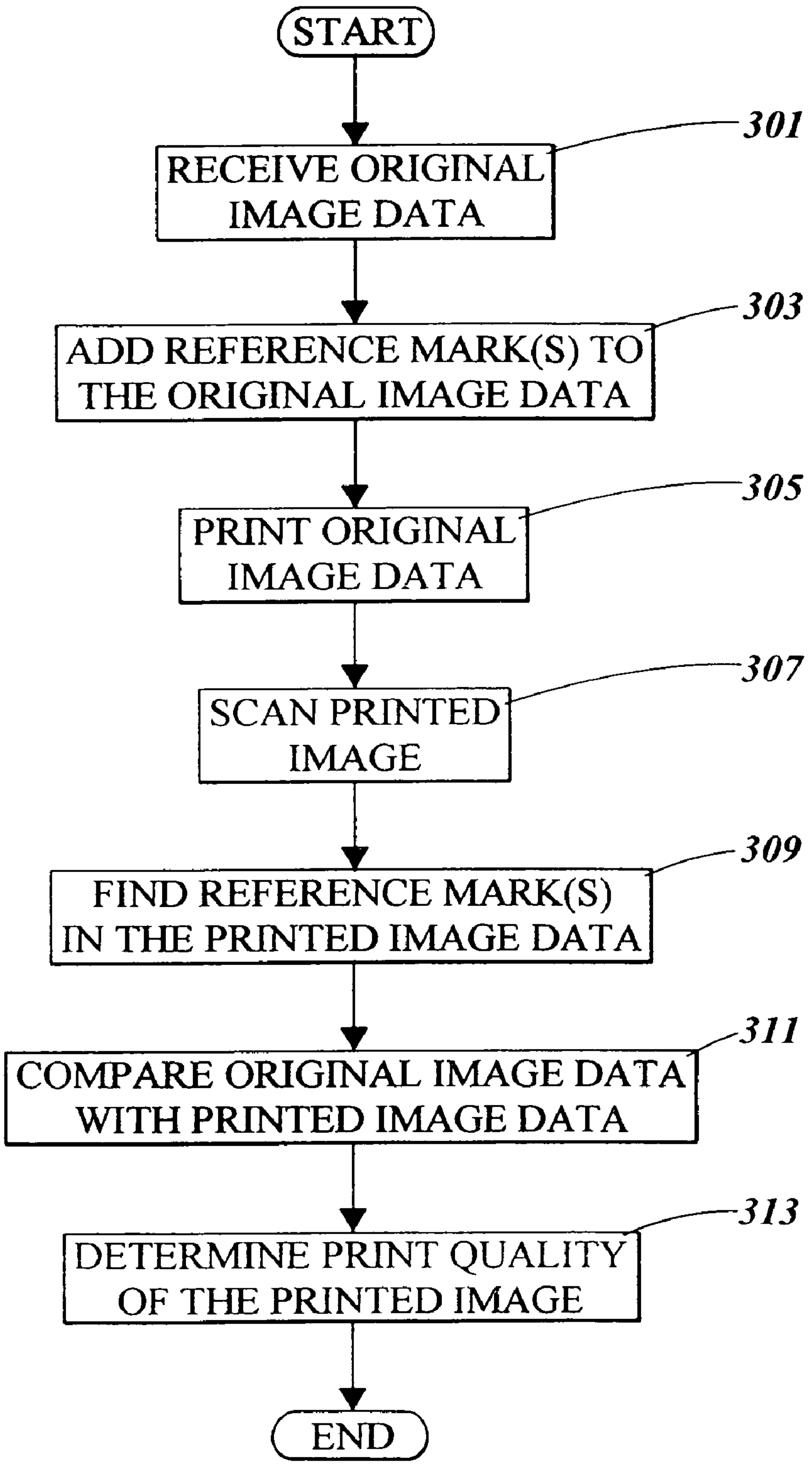
FIG. 3 is a flowchart that illustrates the steps that are performed to compare a printed image with an original image by adding reference marks to the original image data in the illustrative embodiment.

FIG. 3 is a flowchart that illustrates steps performed to compare a printed image with an original image by using a first method for determining pixel locations of a printed image. The processor 201 receives original image data for printing an original image in an image reproducing apparatus 100 (step 301). The original image data is input from a first image source 101. The original image data may originate from a computer or an image scanner, for example. The processor 201 adds one or more reference marks to the original image data to indicate relative locations of pixels from the reference marks in the original image data (step 303).

Figure 4:
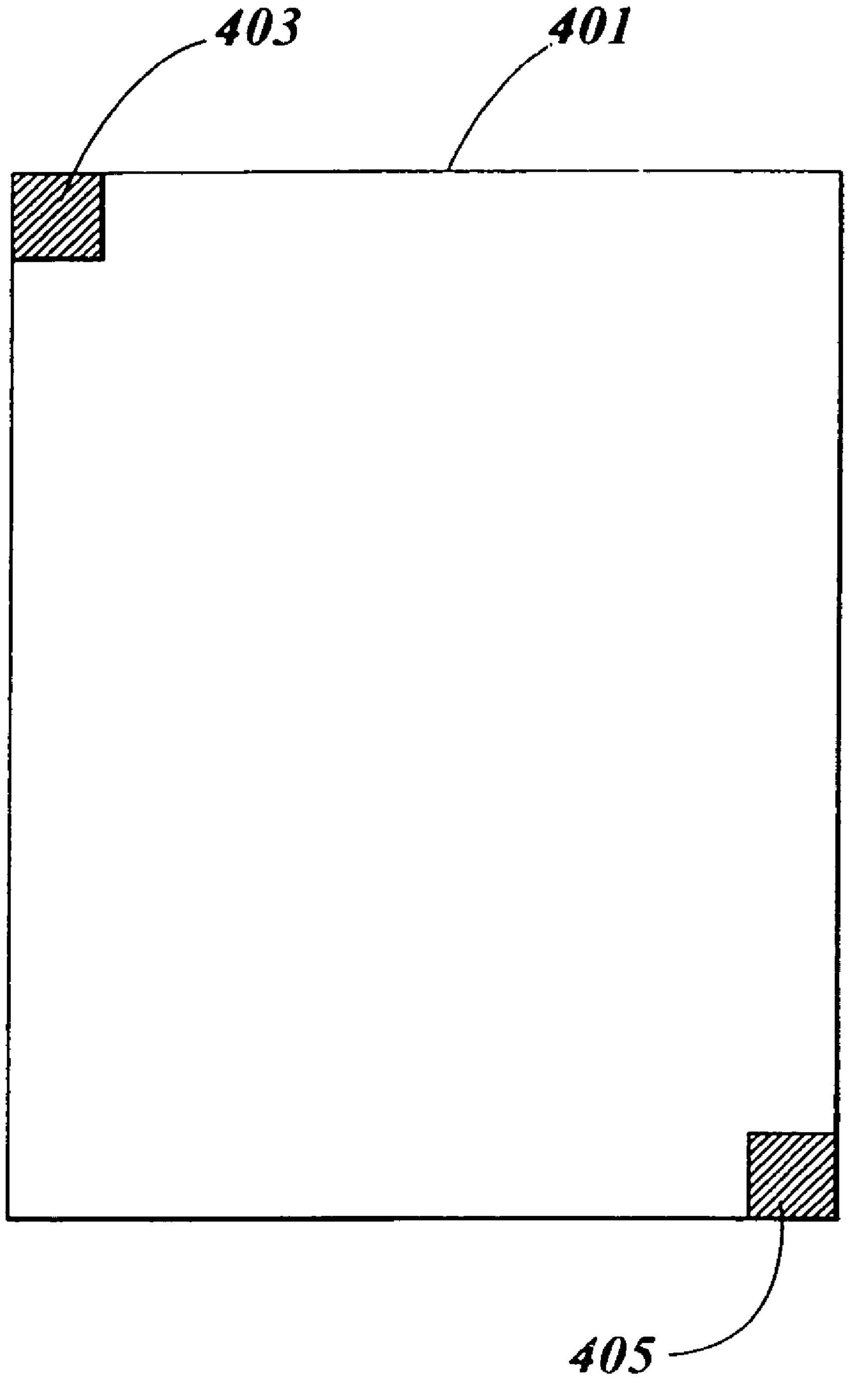
FIG. 4 shows an example where reference marks are added to an original image to indicate relative pixel locations of the original image.

FIG. 4 shows an example where reference marks have been added to the original image data. As shown in FIG. 4, the reference marks are added to left upper and right lower corners 403 and 405 of the original image 401. Those of skill in the art will appreciate that the reference marks may be added to other locations in the original image, for example, centers of left edge side and right edge side.

The processor 201 outputs to the printing engine 105 data for printing the original image. The printing engine 105 prints on a substrate the original image with the reference marks (step 305). The printed image is scanned by a second scanner 107 and the printed image data is fed back to the processor 201 (step 307). The processor 201 finds reference marks in the printed image data (step 309) and determines locations of pixels in the printed image data. The pixel locations of the original image data are determined relative to the reference marks. The processor 201 compares the printed image data and the original image data on a pixel by pixel basis (step 311). The processor 201 compares a pixel of the original image dada with a pixel of the printed image data at a same location relative to the reference marks.

The processor 201 calculates a difference between the original image data and the printed image data for each pixel. The processor 201 compare the difference between the original image data and the printed image data with a threshold value stored in the non-volatile memory element 209 to determine whether the pixel of the printed image is defective. The processor 201 counts the number of defective pixels in the printed image data. If the number of defective pixels is greater than a critical value stored in the non-volatile memory element 209, the processor 201 determines that the print quality of the printed image is not acceptable (step 313).

Figure 5:
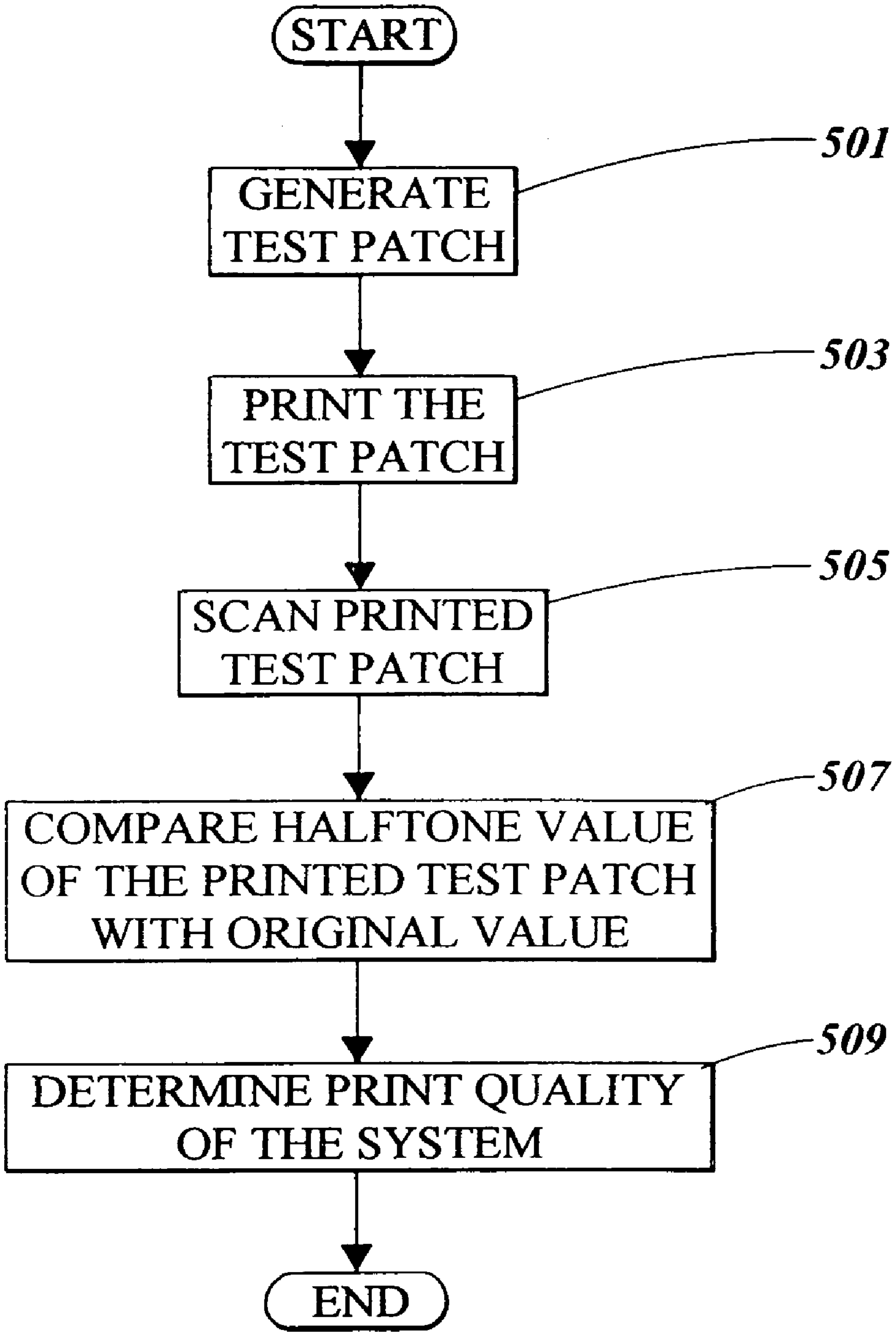
FIG. 5 is a flowchart illustrating the steps that are performed to compare a printed image with an original image by printing a half-tone test patch in the illustrative embodiment.

FIG. 5 is a flowchart that illustrates another method for comparing the printed image with the original image. The processor 201 generates a test patch to print in an image reproducing apparatus 100 (step 501). The processor 201 outputs to the printing engine 105 the data for the test patch. The printing engine 105 prints the half-tone test patch on a substrate (step 503). The printed test patch is scanned by a second scanner 107 to obtain data for the printed half-tone test patch (step 505).

The processor 201 determines half-tone values for each pixel of the printed half-tone test patch image. The processor 201 calculates the differences in values between the printed half-tone test patch and the original half-tone test patch. The processor 201 compares each calculated difference with a threshold value stored in the non-volatile memory element 209 to determine whether each pixel of the printed half-tone test patch is defective. The processor 201 counts the number of defective pixels in the printed half-tone test patch. If the number of defective pixels is greater than a critical value stored in the non-volatile memory element 209, the processor 201 determines that the print quality of the system is not acceptable (step 509).

Figure 6:
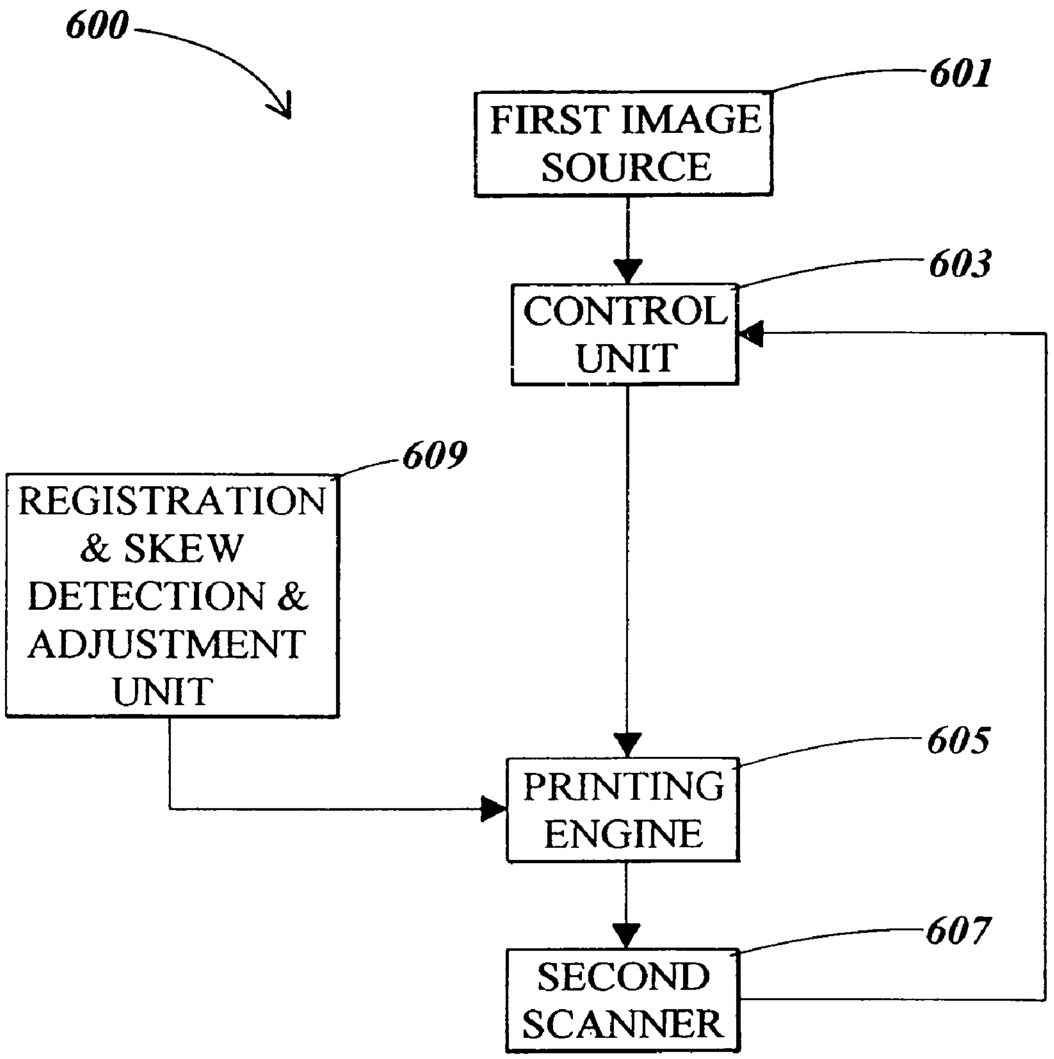
FIG. 6 is an example of a block diagram of an image reproducing apparatus that employs a unit for detecting and adjusting registration and skew of a substrate to ensure that an original image is printed on the substrate in an exacting fashion.

FIG. 6 is another example of a block diagram of an image reproducing apparatus 600 for comparing a printed image with an original image by using a third method for determining pixel locations of a printed image. The apparatus 600 includes a first image source 601, control unit 603, a printing engine 605, a second scanner 607 and a registration and skew detection and adjustment unit 609. The control unit 603 receives data for an original image from the first image source 601. The control unit 603 generates data for printing the original image in the printing engine 605. The printing engine 605 prints an image on a substrate based on the data generated in the control unit 603.

The apparatus 600 additionally includes a registration and skew detection and adjustment unit 609. A number of devices are developed for detecting and adjusting registration and skew in a substrate. For example, U.S. Pat. No. 6,059,284 to Wolf et al. describes an apparatus and method for registering and deskewing a sheet along a sheet path. The registration and skew detection and adjustment unit 609 allows ensuring a perfect registration and no skew of the printed image on the substrate.

The printed image on the substrate is scanned by a second scanner 107 to obtain data for the printed image. The second scanner 107 sends the printed image data to the processor 201. The processor 201 compares the printed image data with original image data on a pixel by pixel basis. The location of the pixels in the printed image data is assumed to be the same as the location of pixels in original image data due to the registration and skew detection and adjustment unit 609. The operation of the processor is described below in more detail.

Figure 7:
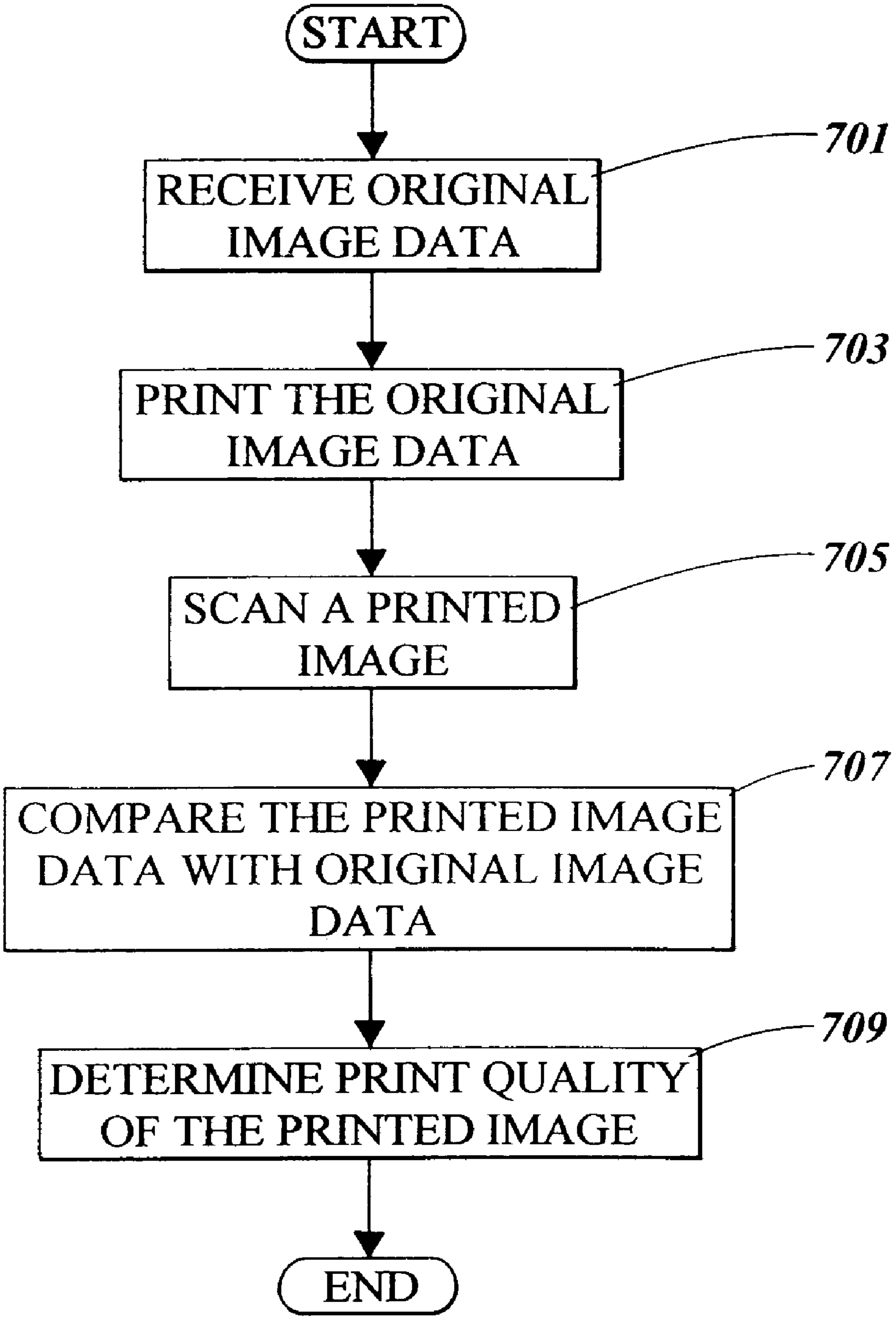
FIG. 7 is a flowchart illustrating the steps that are performed to compare a printed image with an original image by utilizing a unit for detecting and adjusting registration and skew of a substrate.

FIG. 7 is a flowchart that illustrates steps performed to compare a printed image with an original image by employing a registration and skew detection and adjustment unit 609 shown in FIG. 6. The processor 201 receives data for an original image from a first image source 101 (step 701). The processor 201 generates data for printing the original image in the printing engine 105 and prints the image on a substrate based on the generated data (step 703).

In the printing process, the registration and skew detection and adjustment unit 609 examines registration and skew of the printed image. The registration and skew detection and adjustment unit 609 adjusts the detected skew in the substrate. Thus, the registration and skew detection and adjustment unit 609 help to ensure better registration and minimal skew of the substrate. The printed image is read to obtain a printed image data in the second scanner 107 (step 705).

The processor 201 compares a pixel of the original image data with a pixel of the printed image at the same locations. Pixel locations of the printed image data are assumed to be the same as pixel locations of the original image data due to the registration and skew detection and adjustment unit 609. The processor 201 calculates a difference between the original image data and the printed image data for each pixel.

The processor 201 compares the difference of a pixel with a threshold value stored in the non-volatile memory element 209 to determine whether the pixel of the printed image is defective. The processor 201 counts the number of defects in the printed image. If the number of defects is greater than a critical value, the processor 201 determines that the print quality of the printed image is not acceptable.

Figure 8:
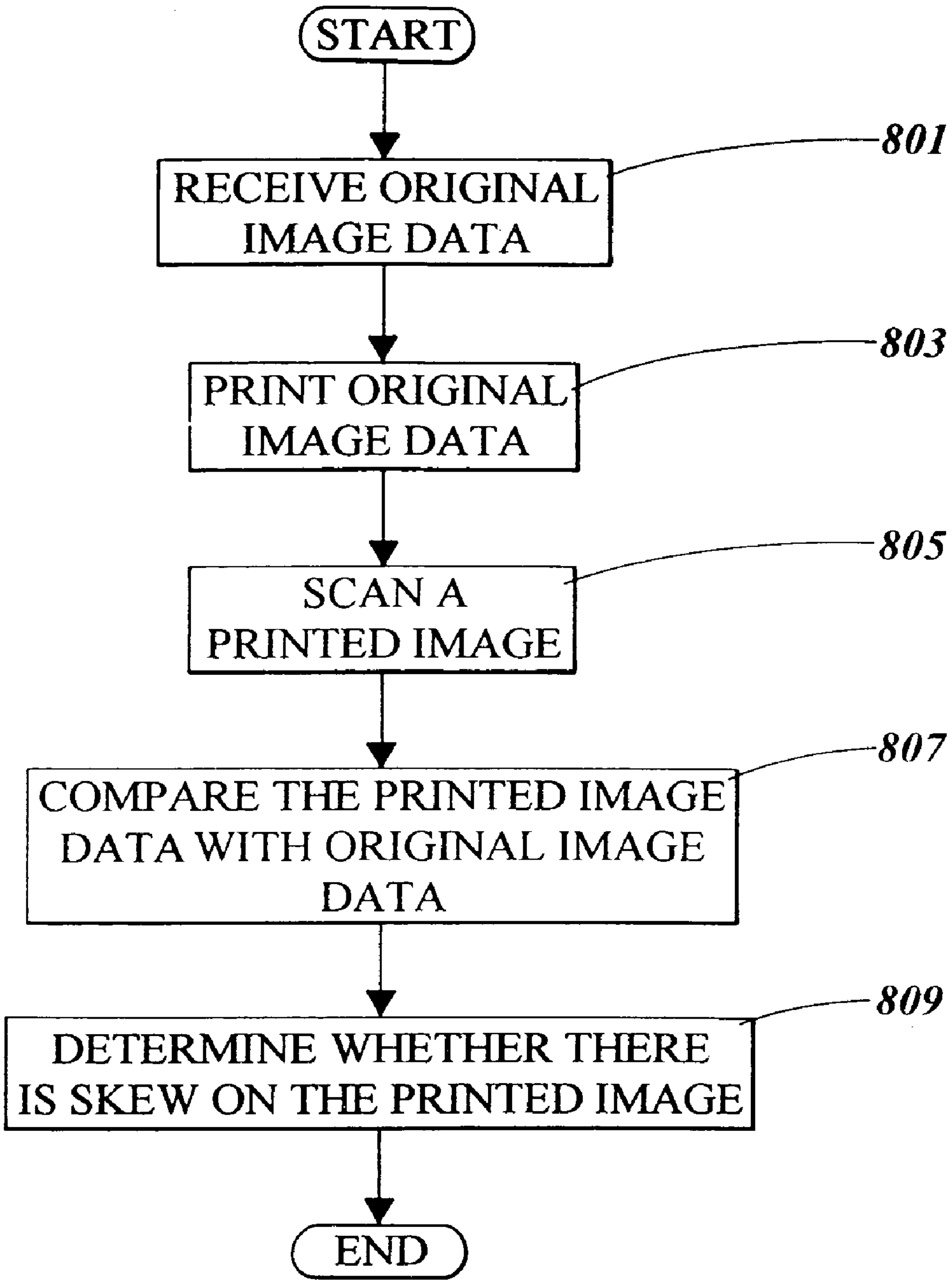
FIG. 8 is a flowchart illustrating the steps that are performed to detect skew of a printed image in the illustrative embodiment of the present invention

FIG. 8 is a flowchart that illustrates steps performed to detect skew of the printed image in the illustrative embodiment of the present invention. The steps 801 through 809 are same as the steps 701 through 709. The processor 201 detects skew of the printed image based on the comparison of the printed image data and the original image data (step 809).

The processor 201 compares a pixel of the original image dada with a pixel of the printed image data at the same location. The processor 201 calculates a difference between the original image data and the printed image data for each pixel. The presence of pixels in a line with a large difference between the printed image and the original image implies skew of the printed image. The threshold value of the difference between the original image data and the printed image may be stored in the non-volatile memory element 209 to determine defective pixels in the printed image. The threshold number of defective pixels may also be stored in the non-volatile memory element 209 for detecting skew of the printed image.

Those of skill in the art will appreciate that the illustrative embodiment for detecting skew of a printed image may be applied to first and second methods for comparing a printed image with an original image, which are illustrated with reference to FIGS. 3 and 5. For example, the skew detection may be performed by detecting reference marks added to the original image data. The processor 201 finds reference marks in the printed image. If there is no skew in the printed image, the reference marks are located on the printed image in a right location that corresponds to the location of the reference mark added to the original image. If the reference marks do not appear in right position on the printed image, it is determined that there is skew in the printed image. The printed image with skew is kicked out and purged to a purge tray.

The illustrative embodiment is also utilized to detect color registration of the printed image. The processor 201 detects color registration of the printed image based on the comparison of the printed image data and the original image data. For example, The processor 201 compares pixels in a top line of the original image dada with pixels in a top line of the printed image data. The processor 201 calculates differences between the original image data and the printed image data for each pixel in the top line. The presence of pixels in the top line with a depletion of color components, such as C, M and Y, indicates an error in color registration of the printed image.

Another example of detecting color registration of the printed image is to add at least one of reference marks to the top line of the original image data. The reference mark added to the top line of the original image data may have a predetermined color value. If there is no error in color registration in the printed image, the reference mark on the printed image has a right color value that corresponds to the predetermined color value of the reference mark added to the original image. If the reference mark does not have a right color value on the printed image, it is determined that there is an error in the color registration of the printed image.

It is, therefore, apparent that there has been provided, in accordance with the present invention, a method and apparatus for analysis of print quality of a printed image. While this invention has been described in conjunction with illustrative embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. In a printing system, a closed feedback loop method for detecting defects of a printed image to analyze print quality of the printed image, said method comprising the steps of:

(a) generating a half-tone image having one or more half-tone values;

(b) printing the half-tone image;

(c) scanning the printed half-tone image to obtain half-tone values for the half-tone image printed wherein the half-tone values of the printed half-tone image are fed back to the printing system in a closed loop manner; and (d) comparing the printed half-tone image to the originally generated half-tone image by, ($d_1$) determining a half-tone value of printed half-tone image for each pixel;

($d_2$) calculating differences of half-tone values between the printed half-tone image and the originally generated half-tone image on a pixel-by-pixel basis;

($d_3$) examining the difference of a pixel to determine whether the pixel of the printed half-tone image falls into a defect; and (e) analyzing the comparison of the printed half-tone values to the original half-tone values to determine print quality of the printed half-tone image.

2. The method of claim 1 further comprising inputting a threshold value of the difference for determining whether a pixel of the printed half-tone image falls into a defect.

3. The method of claim 1 further comprising the steps of:

counting the number of defects in the printed half-tone image; and where the number of defects is greater than a predetermined value, controlling the printing system to stop printing or auto-purge the defective image from the system.

4. An apparatus for detecting defects of a printed image to analyze print quality of the printed image wherein a closed feedback loop method is utilized, said apparatus comprising:

(a) a processor for generating first image data for printing an image, said first image data being half-tone image data, and said half-tone image data having at least one half-tone values;

(b) a printing engine for printing the image on a substrate based on the first image data;

(c) a scanner for scanning the printed image to obtain a second image data and for sending second image data to the processor in a closed feedback loop method; and (d) wherein said processor compares the second image data with the first image data to detect defects of the printed image and determine the print quality, including having said processor determine a half-tone value of the printed half-tone image for each pixel and calculate a difference of half-tone values between the printed half-tone image and the originally generated half-tone image, to determine whether a pixel of the printed image is one of the defects.

5. The apparatus of claim 4 further comprising a memory device for storing a threshold value of a difference of a pixel between the first image and the second image for determining whether the pixel of the printed image falls into a defect.

6. The apparatus of claim 4 further comprising a scanner for reading an image in an original and sending the original image to the processor.

7. The apparatus of claim 4 wherein said processor adds at least one reference mark to the first image data to indicate relative pixel locations of the first image data from the one or more reference marks.

8. The apparatus of claim 7 wherein said reference mark is located at one of corners in the image.

9. The apparatus of claim 7 wherein said processor compares a pixel of the first image with a pixel of the second image at the same locations from at least one reference mark.

10. The apparatus of claim 8 wherein said processor counts the number of defects in the printed image and determines the quality of the printed image based on the number of defects in the printed image.

11. The apparatus of claim 4 wherein said processor counts the number of defects in the printed half-tone image and controls the printing apparatus to stop printing or auto-purge the defective image from the system based on the number of defects in the printed image.

* * * * *